Figure 1:
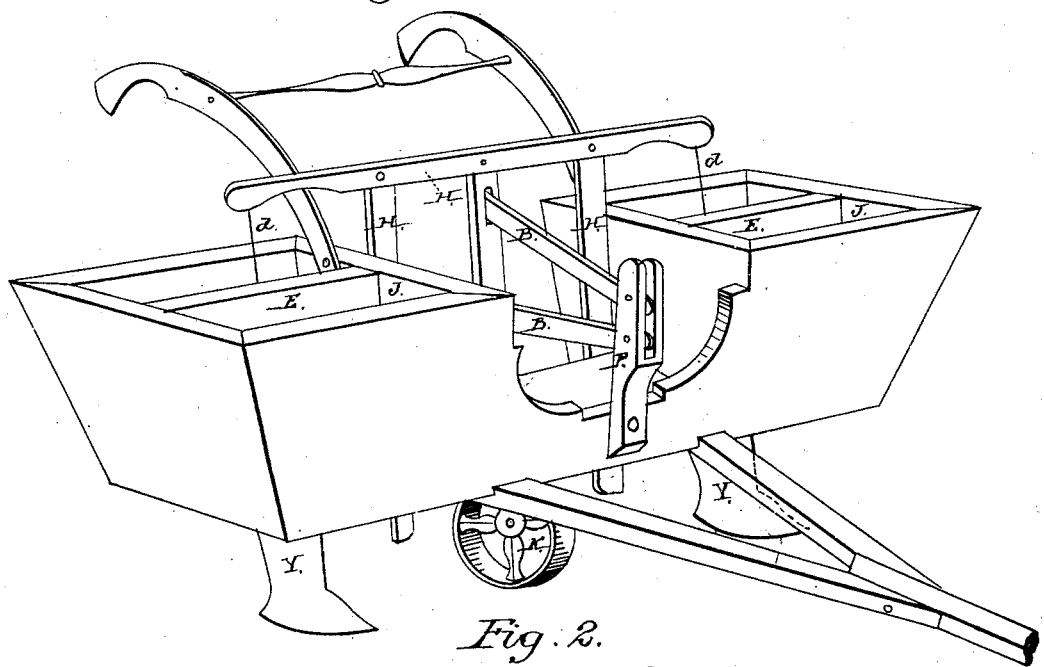
Figure 2:
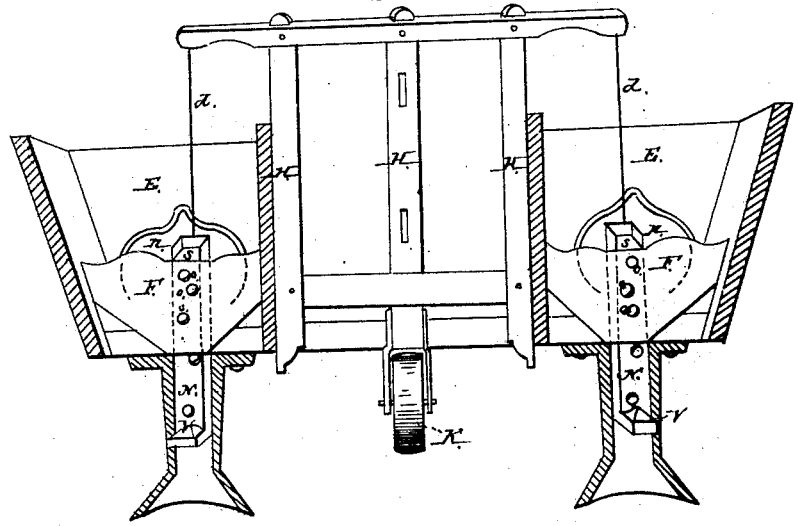

H. WILEY.
Seed Planter.

No. 24,687.

Patented July 5, 1859.

UNITED STATES PATENT OFFICE.

HENRY WILEY, OF FRANKFORT, OHIO.

IMPROVEMENT IN CORN-PLANTERS.

Specification forming part of Letters Patent No. 24,687, dated July 5, 1859.

*To all whom it may concern:*

Be it known that I, HENRY WILEY, of the town of Frankfort, in the county of Ross, and in the State of Ohio, have invented a new and Improved Corn-Planter; and I do hereby declare that the following is a full and exact description thereof, reference being had to the accompanying drawings, and to the letters of reference marked thereon.

My machine is designed for planting ground previously cross-furrowed, the furrows being made of the proper distance apart for the planter in passing the furrows to drop seed for a hill in each furrow.

My invention consists in an improved construction and arrangement of a seed-planter for operating the feed valves or slides and dropping the seed when planting in cross-furrows.

The accompanying drawings 1 and 2 represent my machine, which is intended to plant two rows at a time.

As the machine is drawn forward it is supported chiefly by the seed-tubes Y, the lower ends of which are shaped somewhat like the shares of shovel-cultivators. The wheel K supports the gate or frame H, which is capable of rising and falling independently of the seed-tubes and body of the machine. As this wheel K rises over a furrow-slice it pushes up the gate H, which falls again when the wheel drops into a furrow. By this movement of gate H the feed-slides, No. 2, are worked up and down, they being connected with the gate by rods *d*.

At each side of the machine is a seed box or hopper, J, No. 1, from which the seed passes through the openings *n* in the partition E. As the slides N are pushed up the cups S, No. 2, on the upper ends of the slides carry the seed up to the top of partition F, No. 2, over which the seed falls into the seed-tubes, Y, where it is caught by projections or spring-valves attached to the slides. When the machine advances and the wheel K drops into a furrow the gate H descends, carrying the slide N, and the seed is thus deposited in the furrow. Then, as the wheel K rises from the furrow, the cups S elevate another charge of seed and deposit the same over the partition F into the seed-tubes.

The gate H has a very free motion, it being supported on wheel K and working free of the body of the machine. It is loosely hinged to the upright P by bars B, which are pivoted at both ends, thus giving the wheel K and gate H a free motion independent of the rest of the machine. There is no possibility of clogging or cramping the gate so as to interfere with its action, and therefore the seed is deposited with unerring certainty; and my machine is more durable than those having slides to guide the wheel K. It is also very cheaply constructed.

Having thus fully described my invention, what I claim, and desire to secure by Letters Patent of the United States, is—

The arrangement of the gate H, wheel K, bars B, hopper J, rods *d*, slides N, and seed-tubes Y, being all constructed, arranged, and operated substantially as set forth.

HENRY WILEY.

Witnesses:
ALLEN BLACKER,
S. B. SHANER.